31 -115 SR
12/2/85 OR H 000,175

United States Statutory Invention Registration [19]

[11] Reg. Number: H175
[43] Published: Dec. 2, 1986

Cytron et al.

[54] RESIDUAL STRESS REDUCTION OF PROCESSED DU ALLOY RODS

[75] Inventors: Sheldon J. Cytron, Mountain Lakes; Kenneth Willison, Hamburg, both of N.J.

[73] Assignee: The United States of America as represented by the Secretary of the Army, Washington, D.C.

[21] Appl. No.: 780,874

[22] Filed: Sep. 27, 1985

[51] Int. Cl.[4] ..... H02N 2/00
[52] U.S. Cl. ..... 318/116; 318/118

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

A sonic converter is mounted in a housing assembly into which a depleted uranium rod can be conveniently press fitted and subsequently easily released, for ultrasonic vibrational treatment to reduce residual stress in the rods. The sonic converter is constructed to operate in high temperature environments due to its internal thermal insulation, and an externally connected cooling device. The sonic converter is comprised of a transducer which converts electrical energy into mechanical, vibrational energy, and a horn which amplifies the vibrational energy to the DU rod.

20 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RESIDUAL STRESS REDUCTION OF PROCESSED DU ALLOY RODS

GOVERNMENT INTEREST

The invention described herein may be manufactured, used, or licensed by or for the Government for Government purposes without the payment to me of any royalties thereon.

BACKGROUND OF THE INVENTION

The invention concerns an apparatus for ultrasonically vibrating depleted uranium alloy rods to reduce residual stress and the quench sensitivity of the rods.

In the processing of depleted uranium alloy rods (DU), the rods are heated into the gamma phase region and then water-quenched from 850° C. to bring about the martensitic structure. The material is extremely quench sensitive so that the quenching is undertaken at a precisely controlled rate. A fast quench may cause center voids because of the large differences in the thermal contraction valves of the phases present. A slow quench does not achieve the desired martensitic structure. Furthermore, in large scale batch operations, (where stacks of DU rods are processed in quench baskets) the rods do not experience uniform quenching conditions. This gives rise to residual thermal stresses sufficiently large to cause bowing in the rods. More additional mechanical processing steps (i.e. straightening) are thus necessary to realign the deformed rods. The present technique of eliminating the bowing in the rods involve a three-point bend operation. This realignment operation introduces additional stresses in the rods, and is unsatisfactory for that reason. Any additional residual stress introduced into the rods is likely to increase susceptibility to stress corrosion cracking. Such stresses adversely affect the material by lowering its toughness and ductility. Furthermore, subsequent aging at 350° C. will not substantially relieve these residual stresses.

SUMMARY OF THE INVENTION

The invention concerns an apparatus for ultrasonically vibrating processed depleted uranium (DU) alloy rods to reduce residual stress therein.

A sonic converter, connected to a power supply, is mounted in a housing assembly into which the DU rod can be conveniently press-fitted and subsequently easily released. The sonic converter is constructed to operate in the high temperature environment created by the DU rods as a result of their solutionization at 850° C. by providing adequate thermal insulation and external cooling. Thermal insulation is provided by a ceramic insulator located between the sonic converter and the DU rod, and heat radiation shields which are mounted horizontally within the housing and through which the sonic converter passes. External cooling is provided by a water-cooled interface which encircles a portion of the sonic converter. Specifically, the sonic converter is comprised of a transducer which converts the electrical energy of the power supply into mechanical, vibrational energy, and a horn which amplifies this vibrational energy and effectively couples the transducer to the DU rods. The horn is spring loaded to effect continual intimate contact with the DU rod.

In accordance with the present invention a DU rod is attached to the present apparatus after solutionizing treatment at 850° C. as the rod is in transit to subsequent quenching operations. The ultrasonic treatment provided by the present apparatus is initiated during the quenching operation and subsequently during the aging treatment.

In systems where single DU rods are processed by sequentially passing them through an induction heater ring (for solution heating at 850° C.) to be followed by a water spray ring (for quenching), the present invention can be conveniently installed on the DU rod and activated as the rod undergoes both the solution treatment and the quenching.

DETAILED DESCRIPTION OF THE INVENTION

Figure 1:
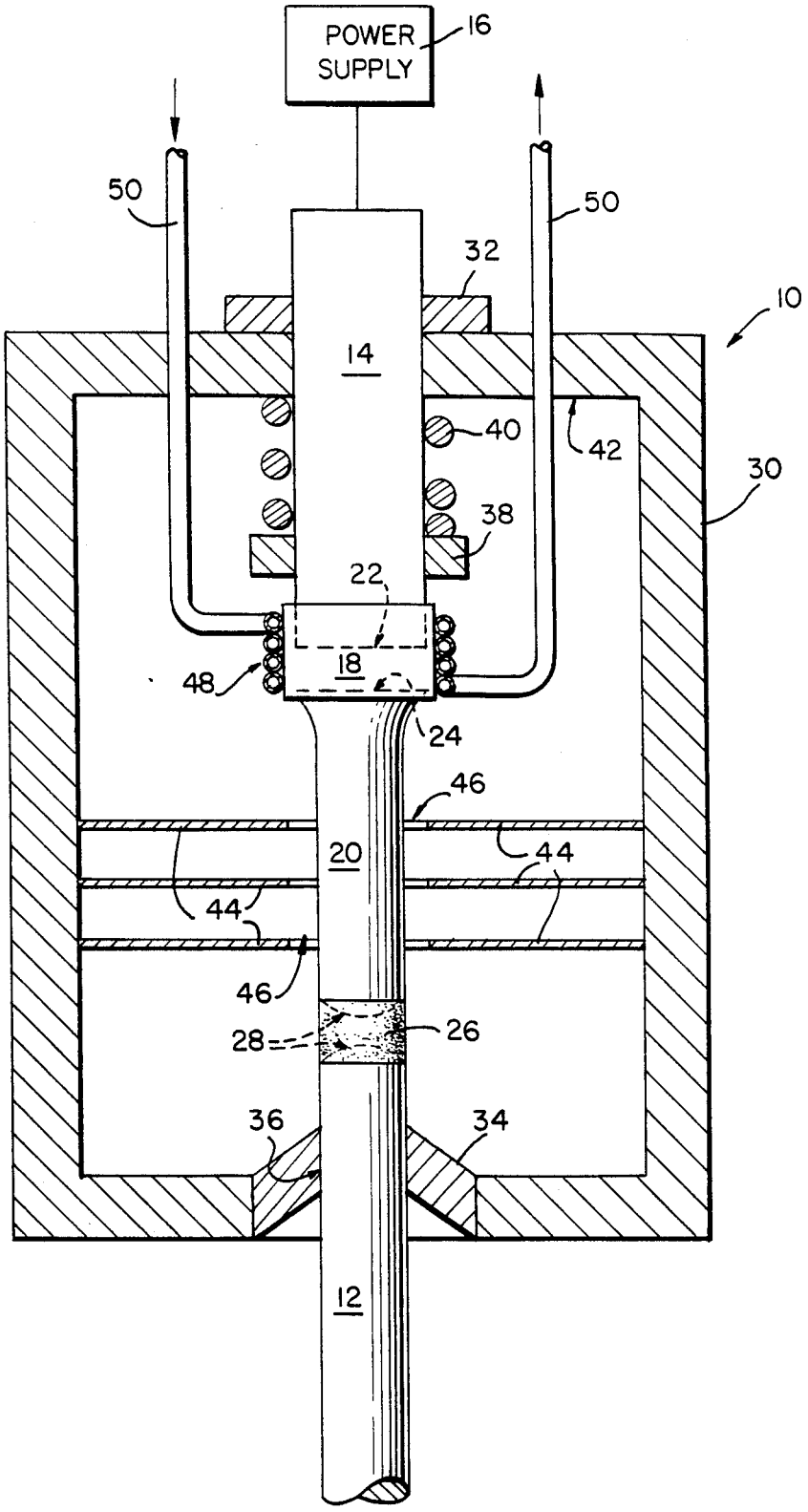
FIG. 1 shows the preferred embodiment of the invention; an apparatus for ultrasonically treating depleted uranium alloy rods.

The ultrasonic DU rod vibrating apparatus in accordance with the present invention, is generally shown at 10, holding a DU rod 12. The transducer 14 is connected to a power supply 16, and converts the electrical energy, received from the power supply 16, into mechanical, vibrational energy. Connected to the transducer 14, via an interface 18, is a horn 20. The interface 18 is a mechanical connector, joining the transducer 14 and the horn 20 (to form a sonic converter) in the manner of a collar, the interface having respective recesses 22 and 24. The purpose of the horn 20 and the transducer 14 is to couple the vibrational energy to the DU rod 12. A solid thermal barrier comprising a ceramic insulator 26 is positioned between the horn 20 and the DU rod 12 to reduce heat transfer to the sonic converter, without decreasing the vibrational energy to the DU rod 12. The ceramic insulator 26 includes two concave surfaces 28 to maintain an axial alignment between the DU rod 12 and the horn 20. As will be apparent below, the horn 20 and DU rod 12 are biased toward one another.

As is evident a housing 30 encloses a substantial portion of the transducer 14, and only a small portion of the DU rod 12. At the top of the housing 30 is a slip ring 32 which slidably engages the transducer 14, allowing vertical movement relative to the housing 30. At the bottom of the housing 30 is a press-fit juncture 34 which frictionally engages and secures the DU rod 12. The press-fit juncture substantially comprises a deformable, conical ring having a passage 36 which is slightly smaller in diameter than the DU rod 12. Thus, when the DU rod 12 is forced into the passage 36, the press-fit juncture 34 secures and maintains the DU rod 12 in position. Within the housing 30, an annular retainer 38 is seen surrounding the transducer 14. The annular retainer 38 is affixed to the transducer 14, moving vertically with the transducer 14. A spring 40 positioned within the housing, about the transducer 14, and between the housing upper wall 42 and the annular retainer 38, obviously urges the transducer 14 downward. Since the horn 20 is laterally connected via the interface 18 to the transducer 14, the horn 20 is also urged downward, and is thus biased towards the DU rod 12 which is maintained in its lateral position by the press-fit juncture 34. Thus, the DU rod being secured against vertical motion, and the horn being biased downward by the spring 40, are spring loaded. Such spring loading makes the purpose of the concave surfaces 28 readily apparent, that being to mate the horn 20 and DU rod 12.

The DU rod 12 is attached to the ultrasonic vibrating apparatus 10 after solutionizing treatment at 850° C., as the DU rod 12 is being removed from a vacuum heat treatment furnace. Thus, the transducer 14 is subjected to great heat that may damage the transducer 14, were thermal insulation not provided. As discussed previously, the ceramic insulator 26 isolates thermally the DU rod 12 and the horn 20, which, in turn, thermally protects the transducer 14. However, additional measures have been taken to insure the thermal isolation of the transducer 14. Specifically, radiation shields are mounted within the housing 30. The radiation shields have orifices and are positioned horizontally such that the horn 20 passes through the orifices 46. Any heat generated from the DU rod 12 inside the housing 30 is deflected by the radiation shields 44. Further thermal isolation is provided by a coil 48 through which water or another cooling fluid is circulated from a reservoir (not shown). The coil 48 is a water-cooling means, carrying heat from the interface 18 to further protect the transducer 14. The water or fluid flowing in the coil 48 via tubing 50 will pass through a finned device, for instance, to reduce the temperature of the water or fluid which was heated by the transfer of heat from the interface 18.

The DU rod 12 is attached to the ultrasonic vibrating or treatment apparatus 10 after solutionizing at 850° C., while in transit to the quenching operation. Use of the apparatus 10 is initiated during the quenching operation and again during upon subsequent aging treatment to yield a greater latitude in quench rates for more reliable processing of the DU rod 12. In addition, ultrasonic vibration during aging of the rod 12 greatly accelerates the nucleation of the hardening precipitates, resulting in shorter aging treatments. A more uniform and finer martensitic structure is obtainable, reducing the influence of differential thermal gradients in batch quenching operations. Residual thermal stresses are reduced sufficiently so as not to result in excess bowing.

Other modifications are apparent to those skilled in the art, which do not depart from the spirit and scope of the present invention, or appended claims. For instance, the ceramic insulators need not have concave surfaces, but merely surfaces which are complementary to the ends of the DU rod and horn. The press-fit juncture may take many forms so long as the DU rod is adequately secured relative to the housing. Similarly, the interface may take many forms, provided an adequate coupling occurs between the transducer and the horn. Furthermore, if the DU rods ar not solution treated as a batch in the vacuum heat treatment furnace, but singularly processed through an induction coil, then the present invention can be attached to each DU rod prior to the solution treatment and activated throughout the solution treatment, quench and aging steps.

What is claimed is:

1. An assembly for processing depleted uranium (DU) rods, including:

a power supply which supplies electrical energy;

a converter connected to the power supply, which converts the electrical energy to mechanical energy;

a housing which encloses a substantial portion of the converter; and a connector located within the housing that connects the DU rod to the converter such that the DU rod is vibrated.

2. The assembly of claim 1 including:

and amplifying means secured between the converter and the connector which amplifies the mechanical energy and hence the vibration of the DU rod.

3. The assembly of claim 2 including: an interface which joins the converter to the amplifier.

4. The assembly of claim 3, including a thermal barrier positioned between the DU rod and the amplifier.

5. The assembly of claim 4, including a biasing device within the housing which biases the converter toward the DU rod.

6. The assembly of claim 5, including a press-fit juncture in the juncture in the housing through which the DU rod passes.

7. The assembly of claim 6, including a thermal insulating means mounted to the housing interior.

8. The assembly of claim 7, including, a retainer secured to the converter and via which the biasing means urges the converter toward the DU rod.

9. The assembly of claim 8, the biasing means comprising a spring coiled about the converter, and positioned between the housing and retainer.

10. The assembly of claim 9, the amplifying means comprising a horn.

11. The assembly of claim 10, the interface means comprising a junction device via which the horn is joined to the converter.

12. The assembly of claim 11, the thermal barrier comprising a ceramic insulator.

13. The assembly of claim 12, press-fit juncture comprising a retention collar which frictionally engages the DU rod.

14. The assembly of claim 13, the thermal insulating means comprising a radiation shield.

15. The assembly of claim 14, the retainer comprising an annular ring, securely fastened to the converter within the housing.

16. The assembly of claim 15, the junction device having first and second recesses into which the converter and horn respectively protrude.

17. The assembly of claim 16, the ceramic insulator having a pair of concave surfaces, one of which is mated with the horn, and the other is mated with the DU rod.

18. The assembly of claim 17, the radiation shield being horizontally mounted with respect to the housing, and having an orifice through which the horn passes.

19. The assembly of claim 18, including a water carrying, cooling means, coiled about the junction device.

20. The assembly of claim 19, including a slip collar secured to the housing exterior via which the converter slidably engages the housing.

* * * * *